United States Patent Office 3,728,329
Patented Apr. 17, 1973

3,728,329
PROCESS FOR PRODUCING PEARL ESSENCES
Nobumitsu Yano, Saitama-ken, Masao Fukushima, Tokyo, Masanori Kishi, Omiya-shi, and Fumio Nagayoshi, Saitama-ken, Japan, assignors to Asahi Kasei Kogyo Kabushiki Kaisha, Osaka, Japan
No Drawing. Filed Jan. 15, 1970, Ser. No. 3,245
Int. Cl. C07d 51/52, 51/54
U.S. Cl. 260—211.5 R
6 Claims

ABSTRACT OF THE DISCLOSURE

By crystallizing at least one compound selected from nucleic acids and their relative nucleic compounds from an aqueous solution thereof in the presence of at least one ionic surface active agent in the solution, there are obtained pearl essences of crystals having smooth surfaces, uniform size and shape, a long diameter of 3–100 microns, a short diameter of 1–40 microns and a thickness of 0.03–3 microns, in a high yield. The pearl luster of the thus obtained pearl essences is strong, and these pearl essences are rich in resistance to chemicals, heat and light. The ionic surface active agents used are cationic, anionic or amphoteric, and are preferably used in a proportion of 1–0.001% by weight of the aqueous solution.

---

This invention relates to a process for producing pearl essences by use of at least one compound selected from nucleic acids and their relative nucleic compounds, which comprises crystallizing the nucleic compound from an aqueous solution thereof in the presence of ionic surface active agents therein.

In order for a pearl essence to have pearl luster, the following conditions are required: The reflex index is large, the crystal is colorless, transparent, thin plate-shaped, 5–100 microns in length and 500–1200 Å. in thickness, and the crystal has smooth surfaces, and is chemically and optically stable, heat-resistant, insoluble in any organic solvent, and well dispersible in paints.

There have heretofore been widely used microcrystals of lead carbonate as crystals satisfying the above-mentioned conditions for pearl luster. However, there is a restriction in the use of lead carbonate because of its toxicity against the human body. Fish platelets are, on the other hand, non-poisonous pearl essences, however the amount of obtainable fish platelets is limited and varies with seasons, and their quality is not always uniform. Therefore, the fish platelets have been unsuitable as elements for modern industry, in which the mass-production of standardized products is required.

The selection of materials having a high refrangibility is first required to produce a pearl essence. Most of nucleic acids and their relative nucleic compounds have a high refrangibility, and they will be ideal pearl essences if they form microcrystals satisfying the above-mentioned conditions for pearl luster.

The present invention has been made as a result of research on the above problem and provides a process for producing pearl essences using nucleic acids or their relative nucleic compounds which are inexpensive and commercially available in a large amount, which is characterized by crystallizing the compounds in the presence of ionic (cationic, anionic or amphoteric) surface active agents in an aqueous solution of the compounds.

In our previous invention a commercial scale production of pearl essences from nucleic acids and their relative nucleic compounds has been established. A small amount of impurities in starting materials, nucleic acids or their relative compounds, is one of the problems encountered in the above commercial scale production of pearl essences. In particular, the use of insufficiently purified starting materials results sometimes in narrowing the scope of the optimum crystallization conditions and greatly preventing the crystallization from proceeding.

We have made many experiments to solve this problem and found that the addition of ionic (cationic, anionic or amphoteric) surface active agents to an aqueous solution of nucleic acids or their relative compounds results in the effective cancellation of the action of a slight amount of impurities interfering with the optimum crystallization of the nucleic compounds, whereby uniform crystals having smooth surface and pearl luster are produced more easily and in a higher yield than the conventional methods.

The mechanism of the addition effect of surface active agents in the present invention has not been clarified as yet. Surface active agents, however, are considered to change property, density balance and diffusion state of the solution containing said compounds and keep the solution under conditions preferable for the formation of their thin plate-shaped microcrystals. This process for producing pearl essences in which ionic surface active agents are used in the course of the formation of crystals of nucleic acids or their relative nucleic compounds to obtain uniform and smooth-surfaced crystals with pearl luster easily and in a high yield is quite novel.

An object of the present invention is to provide a novel process for producing pearl essences in which the crystals have a uniform size and shape. Another object of the invention is to provide a process for easily producing thin plate-shaped crystals of pearl essences. A further object of the present invention is to provide a method for the crystallization of nucleic acids or their relative compounds for pearl essence in a high yield. A still further object of the invention is to provide a process for producing nucleic acids or their relative nucleic compounds for pearl essences with strong pearl luster. The other objects and the effects of the present invention will be apparent from the following description.

The cationic surface active agents used in the present invention are, for example, amines and their salts, quaternary ammonium salts, pyridinium salts, picolinium salts, zelane type, belane type, amineformaldehyde condensation products, and stearon chromic chloride. The anionic surface active agents used are, for instance, alkyl sulfates, alkylbenzene sulfonates, alkylnaphthalene sulfonates, naphthalene sulfonate-formaldehyde condensation products, alkyl phosphates, amidosulfonates and sulfosuccinate dialkyl esters. The amphoteric surface active agents used in the present invention include betaine type (for example, alkylbetaine), sulfoxylate type (for example, hydroxyethylene imidazoline sulfoxylate), sulfonate type; phosphate type and the like.

Appropriate concentrations of the surface active agents used in crystallizing nucleic acids and their relative compounds may vary depending upon the kind of surface active agents and nucleic compounds, though in general, a concentration of 1–0.001% by weight based on the weight of an aqueous solution of the nucleic compounds is preferable. The surface active agents may be added to the aqueous solution at the time the solution is prepared, or just before or after the first microcrystal of the nucleic compound comes out.

The nucleic acids or their relative nucleic compounds used in this invention include pyrimidine nucleic bases, purine nucleic bases and their derivatives. These nucleic compounds must satisfy the necessary conditions for pearl essences mentioned above when the crystallization conditions are suitably selected.

The pyrimidine nucleic acids and their relative nucleic compounds used include pyrimidine nucleic bases represented by the following general formula:

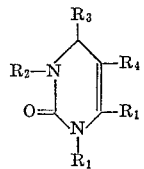

wherein $R_1$ is a hydrogen atom or an alkyl group having one to four carbon atoms; $R_2$ is a hydrogen atom or an alkyl group having one to four carbon atoms; $R_3$ is $OR_6$,

or a hydrogen atom; $R_4$ is a hydrogen atom, $OR_9$,

$NO_2$ or an alkyl group having one to four carbon atoms; $R_5$ is a hydrogen atom, $OR_{12}$,

$NO_2$ or an alkyl group having one to four carbon atoms; $R_6$, $R_9$ and $R_{12}$ are hydrogen, alkyl groups having 1 to 4 carbon atoms or

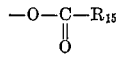

$R_7$, $R_8$, $R_{10}$, $R_{11}$, $R_{13}$ and $R_{14}$ are hydrogen or alkyl groups having 1 to 4 carbon atoms; and $R_{15}$ is an alkyl group having one or two carbon atoms; pyrimidine nucleosides having the above-mentioned formula in which $R_1$ is pentose, such as ribose, arabinese or xylose or an acetylderivative or isopropylidene derivative thereof; or hexose, such as glucose, mannose, or fructose; derivatives of the pyrimidine nucleosides; nucleotides having the above-mentioned formula in which $R_1$ is a pentose having phosphate group at the 2', (3')- and/or 5'-position; metal salts of the nucleotides, such as alkali metal salts, alkaline earth metal salts and aluminum salts; amino acid salts of the nucleotides; and various derivatives of the nucleotides in which the hydrogen atoms of the phosphate are substituted to form a structure represented by the formula:

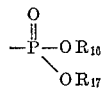

wherein $R_{16}$ and $R_{17}$ are hydrogen atoms, alkyl groups having one to four carbon atoms,

These pyrimidine nucleic acids and their relative nucleic compounds are generally found as naturally occurring nucleic acids. Of these compounds there are mainly used 5' - uridylic acid, 5' - cytidylic acid, which are obtained as byproducts in producing 5' - inosinic acid and 5'-guanylic acid which are palatable nucleotides, from ribonucleic acid, said uridilic and cytidylic acids having not been used in any field; the salts and derivatives of the uridilic and cytidylic acids; uridine, cytidine, uracil and cytocine which are easily obtained by chemical decomposition and/or enzymatic decomposition of said acids, salts and derivatives.

The purine nucleic acids and their relative nucleic compounds used in this invention include purine nucleic bases represented by the general formulas:

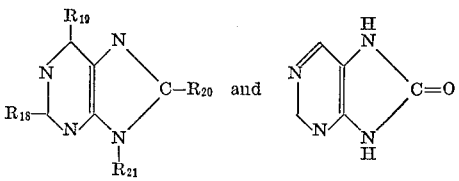

wherein $R_{18}$ and $R_{19}$ are hydrogen atoms, $OR_{22}$,

or $-S-R_{25}$; $R_{20}$ is a hydrogen atom or an alkyl group having one to four carbon atoms; $R_{21}$ is a hydrogen atom or an alkyl group having one to four carbon atoms; $R_{22}$ is a hydrogen atom, an alkyl group having one to four carbon atoms or

$R_{23}$, $R_{24}$ and $R_{25}$ are hydrogen atoms or alkyl groups having one to four carbon atoms; $R_{26}$ is an alkyl group having one to four carbon atoms; purine nucleosides having the former formula in which $R_{21}$ is a pentose, such as ribose, arabinose or xylose, an acetyl or isopropyridine derivative thereof, or a hexose, such as glucose, nannose or fructose; derivatives of the nucleosides; nucleotides having the above formed formula in which $R_{21}$ is a pentose having phosphate group at 2', (3')-and/or 5'-position; various metal salts of the nucleotides, such as alkali metal salts, alkaline earth metal salts and aluminum salts; amino acid salts of the nucleotides; and various derivtives of the nucleotides in which the hydrogen atoms of the phosphate are substituted to form a structure represented by the formula:

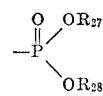

wherein $R_{27}$ and $R_{28}$ are hydrogen atoms, alkyl groups having one to four carbon atoms,

These purine nucleic acids and their relative nucleic compounds are generally found as naturally occurring nucleic acids. Of these purine compounds, there may mainly be used in the present invention 5'-inosinic acid, 5'-guanylic acid, 5'-adenylic acid, and salts, and derivatives thereof, these compounds having recently attracted attention and a commercial scale production thereof having been established; inosine, guanosine, adenosine, hypoxanthine, guanine, and adenine which are easily obtained as intermediates in the production of said acids or by chemical decomposition and/or enzymatic decomposition of said acids.

According to the present process, crystals satisfying the requirements for pearl essences can be produced with more uniform sizes and in higher yield than the conventional methods.

The present invention provides a process for producing pearl essences by precipitating crystals of nucleic acids and their relative compounds from an aqueous solution thereof, characterized in that an ionic surfactant as mentioned above is present. The crystallization conditions other than the presence of the surfactant for example, cooling, change in pH addition of solvent, etc., may vary depending upon the kind of nucleic compounds used and upon the kind of the surfactant used. However, it is preferable to suitably select and use such a method that an aqueous solution of a nucleic compound is formed, ⅕–¾, preferably ⅓–⅔ of the solute is precipitated within 30 min., preferably within 10 min. and the remaining unprecipitated nucleic compound is gradually precipitated in a period of one hour to a day, said method having previously been invented by the present inventors.

Briefly speaking, the present invention has solved the problem which has never been solved by the prior art, (for example, making uniform the size, shape and thickness of crystals of nucleic compounds for pearl essences).

For example, it has heretofore been very difficult to control the ammonia escape rate on a boiling water bath in the separation of guanine from an ammoniacal solution thereof, and needle-shaped crystals of guanine have been formed very often. Even when thin plate-shaped crystals have been formed by controlling the crystallization conditions within a very narrow range, the resulting crystals have had different sizes, forms and thicknesses, and the starting guanine has been required to be extremely highly pure. That is, even when guanine having a purity of more than 99% is used, the crystallization in the absence of a surface active agent results in the formation of large and small crystals, and even when the sizes of the resulting crystals are on an average within 3–100 microns in long diameter, 1–40 microns in short length and 0.05-3 microns in thickness, the distribution of the sizes of the crystals is over a very wide range. Therefore, these crystals have at least pearl luster near that of natural fish platelets.

By adding surface active agents, crystals of the desired long and short diameters can easily be obtained. For example, it has become possible for all crystals to have a size of 15 microns or 20 microns. It has also become possible for all crystals to have one shape of square, pentagon and hexagon. Also furthermore, there has become possible the formation of relatively thin crystals having a thickness of 0.1–0.03 micron. The pearl luster of the thus obtained crystals has thereby greatly been enhanced.

The following advantages are obtained by adding surface active agents.

(1) Crystals can be obtained in uniform size and shape.
(2) Thin crystals are easily obtained.
(3) Even from impure starting materials, the crystals wanted are obtained.
(4) The amount of crystals obtained is increased, and the yield is also enhanced because the size and shape of the crystals are uniform.
(5) Pearl luster is enhanced, for the shape, size and thickness are uniform.

The pearly essences obtained by the present process from nucleic acids and their relative compounds are superior in all points, such as chemical resistance, heat resistance and light resistance, etc. and have strong pearl luster. These essences are inexpensive and non-poisonous, and can, of course, be used in all fields where conventional pigments are used, as they are or after being formulated to meet each purpose. Further, they can be incorporated into or coated on various material for cosmetics, foods, drinks, tablewares and toys.

Examples are given below. These are merely illustrative and this invention is not restricted thereto. Parts and percentages used in the examples are by weight.

EXAMPLE 1

20 gm. of white powder of uracil (purity: 93.8%) was added to 1 l. of distilled water, and heated to form a solution, which is referred to as Solution A. 1 gm. of a cationic surface active agent, Cation $M_2$-100 (a trade name), was added to 9 l. of distilled water. The resulting solution is referred to hereinafter as Solution B. Solution A was added at once to Solution B with stirring, and the mixture was gradually cooled to 20° C. in 3 hrs. at which thin plate-shaped microcrystals of less than 1 micron were formed. Then, stirring was rapidly slowed down, and the mixture was gradually cooled to 0° C. in 1 hr. Smooth-surfaced crystals were observed with pearl luster, said crystals having a long diameter of 15–20 microns, a short diameter of 10–15 microns and a thickness of 0.08 micron. The reaction was continued for 2 hrs. under such conditions, upon which the formed crystals all had the size mentioned above, and the solution showed strong streamline pattern. The thus formed crystals were filtered off from the solution, dried and mixed with resins. The resulting mixture was subjected to compression molding or injection molding to obtain a synthetic resin molded product with pearl luster.

EXAMPLE 2

20 gm. of white powder of cytosine (purity: 97.2%) was added to 2 l. of distilled water, and the resulting mixture was heated to form a solution. The solution was cooled to 50° C., at which 1 gm. of an anionic surface active agent, Trax K–40 (a trade name), was added to the solution. Adding methanol at a rate of 50 ml./min. to the solution, microcrystals of about 1 micron were formed. The solution was cooled to 0° C. in 1 hr. The cooling was continued for 2 hrs. under this condition, after which strong streamline pattern appeared in the solution. The thus obtained thin plate-shaped crystals were rectangular or rhombic, and have a diameter of 15 microns, a width of 10 microns, and a thickness of 0.1 micron. These crystals were filtered, collected, washed with methanol, dried in the air. Then, a paste was prepared from the crystals using a solvent, a dispersing agent and resins. This paste was diluted suitably to obtain a pearl luster paint.

EXAMPLE 3

20 gm. of white powder of hypoxanthine (purity: 94.5%) was added to 10 l. of 0.5 N aqueous ammonia and heated to form a solution. 0.5 ml. of an anionic active agent, Rapyzol B–30 (a trade name) was added to the solution. The ammonia in the solution was evaporated off on a boiling water bath, to precipitate thin plate-shaped microcrystals of less than 1 micron were formed. This solution was gradually cooled to 5° C. in 5 hrs., upon which needle microcrystals were formed. Stirring slowly this solution at 5° C. for 2 hrs., strong streamline pattern appeared in the solution. Then the resulting crystals were in the form of fish platelets having a diameter of 15–20 microns, a width of 2–3 microns and a thickness of 0.08–0.1 micron. These crystals were filtered with suction, and the resulting wetted crystals was subjected to flashing to remove the liquid on the surface, washed with methanol, blended with materials according to the purpose of use to obtain excellent pearl essences for imparting pearl luster.

EXAMPLE 4

20 gm. of white powder of guanine (purity: 97.0%) was dissolved in 9 l. of 0.5 N aqueous ammonia by heating. Ammonia was evaporated from the solution on a boiling water bath to deposit microcrystals of less than 1 micron. These crystals were filtered off, and to the filtrate was added 100 ml. of 1% aqueous solution of an anionic active agent, Trax H–45 (a trade name). The resulting mixture was allowed to stand in a cold room (5° C.). Rectangular or square crystals of 10–15 microns in diameter, 5–10 microns in width and 0.07 micron in thickness were obtained after about 10 hours. These crystals were filtered with suction, subjected to flashing to remove the liquid left on the surfaces of crystals, washed with methanol, and then dispersed in nitrocellulose. 20.2 parts of the crystals dispersed into nitrocellulose, 7.5 parts of Santolite, 3.8 parts of dibutyl phthalate, 25.3 parts of butyl acetate, 6.4 parts of ethanol, 1.1 parts of butanol, 32.7 parts of toluol and 3.0 parts of a coloring matter were blended to produce a manicure, which had good pearl luster.

EXAMPLE 5

50 gm. of white powder of adenine (purity: 98.5%) was added to 500 ml. of 0.5 N hydrochloric acid and heat-dissolved therein, which is referred to hereinafter as Solution A'. Separately, 0.5 gm. of an amphoteric surface active agent, Anon BF (a trade name), was added to 9 l.

of distilled water to form a solution, which is referred to hereinafter as Solution B'. Solution A' was added at once to Solution B' while stirring the latter. The pH of the solution was adjusted to 2.8 by adding 0.1 N sodium hydroxide. The solution was then cooled to 5° C. in 2 hrs. with stirring to precipitate microcrystals of adenine, at which point stirring was stopped and the solution was kept at 5° C. After 5 hours, the microcrystals grew to uniform crystals of about 20 microns in diameter, 2-3 microns in width and about 0.1 micron in thickness. When this solution was stirred, a strong streamline pattern was observed. The resulting crystals were filtered and completely dehydrated by flashing. 2 parts of the thus obtained thin plate-shaped crystals of adenine, 100 parts of a polyvinyl chloride resin, 4.8 parts of dioctylphthalate, 0.7 part of cadmium stearate and 0.5 part of barium stearate were mixed, and kneaded on an ovenroll at 170° C. The resulting mixture was passed through a calender roll to form a pearl sheet.

EXAMPLE 6

15 gm. of white powder of guanine (purity: 97.0%) and 5 gm. of white powder of hypoxanthine were added to 9.5 l. of 0.5 N aqueous ammonia, and the resulting mixture was heated to form a solution. Ammonia was evaporated from the mixture on a boiling water bath to precipitate thin plate-shaped microcrystals of less than 1 micron. This solution was subjected to filtration, and to the filtrate was added 150 ml. of a 1% aqueous solution of an anion surface active agent, Trax D (a trade name), and allowed to stand in a cold room at 5° C. After about 5 hrs., crystals of 25-30 microns in diameter, 5-6 microns in width and 0.08 micron in thickness were obtained. The shape of the crystals was compared with that of fish platelets of a herring by means of a microscope to find that both were very alike, and the sizes of the synthesized crystals were very uniform, while the plain sizes of the fish platelets were not uniform.

The thus obtained crystals were filtered with suction and the resulting wet crystals were subjected to flashing to remove the liquid on the surfaces of the crystals, and then washed with methanol. 150 parts of bees wax, 10.0 parts of lanoline, 4.0 parts of carnauba wax, 2.0 parts of bromic acid, 5.0 parts of cetanol, 49.0 parts of castor oil, 4.0 parts of ceresine, 10.0 parts of the obtained guanine (paste) and 1.0 part of perfume were mixed and lipsticks were produced therefrom. These lipsticks have strong pearl luster.

EXAMPLE 7

Methanol was dropped into 100 ml. of a 20% aqueous solution of white powder of cytidine (purity: 97.0%) at a rate of 50 ml. per minute, and just before the separation of crystals, 5 ml. of a 1% solution of an anionic active agent, Newlex (a trade name) was added to the solution. Methanol was added again dropwise to the solution to precipitate microcrystals, at which point stirring was stopped, and the solution was gradually cooled to 5° C. in about 1 hr. by lowering the temperature of the water bath. Substantially square or rectangular crystals of about 5 microns in diameter and about 0.1 micron in thickness were obtained. These crystals were filtered, washed with methanol and dried in air. The dried crystals were again suspended in methanol and the resulting suspension was stirred, whereby a streamline pattern with excellent pearl luster, which pattern proves that the crystals can be used as the desired pearl essences, was observed.

EXAMPLE 8

1 l. of a 0.5% suspension of needle crystals of guanosine (purity: 92.5%) was heated on a boiling water bath to form a solution. Ethanol was added dropwise thereto at a rate of 30 ml. per minute, upon which thin needle-shaped or rectangular microcrystals of less than 3 microns were precipitated. At this point, 1 ml. of a 1% aqueous solution of an anionic active agent, Daimabon-S (a trade name), was added, and the solution was quickly cooled to 5° C. in 5-10 min. with stirring, at which temperature the solution was kept for about 1 hr. Thereupon, a streamline pattern appeared in the solution, and the crystals obtained were in the form of smooth plates having a diameter of about 25-30 microns, a width of about 10 microns and a thickness of about 0.1-0.12 micron. These crystals were filtered to obtain a 20% wet cake. 5 parts of this wet cake was mixed with 10 parts of a tragacanth-solution (2%), 5 parts of glycerine, 0.8 part of castor oil, 5 parts of stearic acid, 2 parts of propylene glycol-stearine, 0.4 part of triethanol amine, 71.8 parts of water and a small amount of a perfume and an antiseptic to obtain a cosmetic milk with beautiful pearl luster.

EXAMPLE 9

To 100 parts of an aqueous paste of a thin plate-shaped crystal of uracil prepared in the same manner as in Example 1 was added 19 parts of a saturated polyester resin containing 5% of sorbitan monooleate, the resulting mixture was stirred and the separated water was removed by decantation to obtain a paste having a water content of 9%. This paste was dried at 55° C. for 3 hrs. under a reduced pressure. The thus obtained dehydrated paste was dispersed in 100 parts of methyl isobutyl ketone, and the resulting dispersion was added in an amount of 1% to an acrylic resin or a partial polymer of polyester resin. The resulting mixture was put in a metal cylinder, which was then sealed and rotated to allow heat-polymerization to proceed (so-called conventional centrifugal method), whereby a cylindrical polymer having beautiful pearl luster was obtained. The heat-resistance, light-resistance and hydrogen sulfide-resistance of a piece of the resulting cylindrical polymer were measured. The heat-resistance was determined by allowing the piece to stand in an air oven at 150° C. for 6 hrs. and observing the color at that time. The light-resistance was determined by exposing the piece to light in a Fade-O-Meter at 55° C. for 25 hrs. according to JIS-L-1044-1959 and observing the color at that time. The hydrogen sulfide-resistance was determined by heating the piece in hydrogen sulfide-saturated solution at 40° C. for 30 min. and observing the color at that time. As a result, it was found that the acrylic resin containing uracil and the polyester resin containing uracil both were not colored. On the other hand, an acrylic resin or polyester resin containing a microcrystal of bismuth chloride, lead arsenate or lead carbonate, which was prepared in the same manner as above, was, in all cases, colored when subjected to the tests under the same conditions, though there is a difference in degree of coloration.

EXAMPLE 10

Using an aqueous paste of a thin plate-shaped crystal (crystalline concentration: 55%) of guanine prepared in the same manner as in Example 4, an acrylic resin plate or a polyester resin plate was prepared in the same manner as in Example 9 and subjected to the same tests as in Example 9. As a result, it was found that in every case, the plate was not colored and the pearl luster was also not changed.

EXAMPLE 11

The cosmetic milk containing guanosine obtained in Example 8 was exposed to light in a Fade-O-Meter at 55° C. for 25 hrs. according to JIS-L-1044-1959 to find that the milk was not colored. The pearl luster after exposure was the same as before exposure.

What is claimed is:

1. In a process for producing pearl essences by use of a compound selected from the groups consisting of nucleic acids and nucleic bases thereof, the improvement which consists essentially of effecting the crystallization in the presence of an ionic surface active agent selected from the group consisting of amines, salts of the amines, quaternary ammonium salts, pyridinium salts, picolinium salts, zelane salts, belane salts, amine-formaldehyde condensation products, stearon chromic chloride, alkyl sulfates, alkylbenzene sulfonates, alkylnaphthalene, sulfonates, naphthalene sulfonate-formaldehyde condensation products, alkyl phosphates, amido-sulfonates, sulfosuccinate dialkyl esters, alkyl betaines and hydroxyethylene imidazoline sulfoxylate.

2. A process according to claim 1 wherein said compound is a ribonucleic base selected from the group consisting of adenine, guanine, hypoxanthine, cytosine, uracil, and nucleosides containing these bases.

3. A process according to claim 1, wherein the starting material for pearl essences is at least one nucleic base selected from the group consisting of guanine, adenine, hypoxanthine, cytosine and uracil.

4. A process according to claim 1, wherein the starting material for pearl essences is at least one nucleoside selected from the group consisting of guanosine, adenosine, inosine, cytidine and uridine.

5. A process according to claim 1, wherein the amount of the ionic surface active agent added is 1–0.001% by weight based on the weight of the aqueous solution.

6. A process according to claim 1 wherein the ionic active agent is selected from the group consisting of quaternary ammonium salts, alkyl sulfates, alkylbenzene sulfonates, alkylnaphthalene sulfonates, naphthalene sulfonate-formaldehyde condensation products and alkyl betaines.

References Cited
UNITED STATES PATENTS

| | | | |
|---|---|---|---|
| 3,300,477 | 1/1967 | Jacob et al. | 260—211.5 R |
| 3,364,199 | 1/1968 | Yamazaki et al. | 260—211.5 R |
| 3,457,254 | 7/1969 | Yano et al. | 260—211.5 R |
| 3,471,471 | 10/1969 | Maguire | 260—211.5 R |
| 3,557,081 | 1/1971 | Suzuki et al. | 260—211.5 R |

LEWIS GOTTS, Primary Examiner

J. R. BROWN, Assistant Examiner

U.S. Cl. X.R.

106—162, 291; 424—DIG. 5, 61, 64, 361; 260—251, 252

UNITED STATES PATENT OFFICE
CERTIFICATE OF CORRECTION

Patent No. 3,728,329    Dated April 17, 1973

Inventor(s) Yano et al.

It is certified that error appears in the above-identified patent and that said Letters Patent are hereby corrected as shown below:

Column 1 insert claim of priority -- Japanese Application No. 2930/69 filed January 17, 1969 --.

Signed and Sealed this sixteenth Day of March 1976

[SEAL]

Attest:

RUTH C. MASON
Attesting Officer

C. MARSHALL DANN
Commissioner of Patents and Trademarks